January 5, 1937

UNITED STATES PATENT OFFICE 2,066,958

SEALING COMPOSITION

Henry Lowe Brownback, Norristown, Pa.

No Drawing. Application May 13, 1933, Serial No. 670,998. In France August 6, 1932

6 Claims. (Cl. 106—8)

This invention is a novel composition for use in sealing, coating, or lubricating metallic or other surfaces, and one object thereof is to provide an insoluble non-oxidizing, non-polymerizing composition for sealing contacting metallic surfaces, or for sealing gaskets of any type on metallic surfaces; or for sealing threaded pipe connections.

Another object is to provide an insoluble composition for use as a surface covering for metals to prevent corrosion thereof.

A further object is to provide an insoluble non-oxidizing, non-polymerizing composition for use as a lubricant for pumps, piston rods, and marine propeller-shaft or other stuffing boxes, or the like.

While many compositions, such as paints and shellacs, have heretofore been used, most of them offer great obstacles to general use as a sealing composition. The shellac and paint, and grease compositions will dry and harden, and in so doing lock the surfaces together so tightly that it is usually necessary to damage the gaskets and surfaces in order to separate them, and the same objection arises with respect to pipe and other threads, unions, and the like. In their dry or hardened state these compositions are inelastic and often crack and leak thus becoming ineffective. They are also soluble in certain benzol and alcohol compounds and are not heat resistant. Also certain soft soaps have been used to eliminate these defects, however these soft soaps are soluble in water and are alkaline in their reactions, destroying the surfaces of many metals.

All of the foregoing substances when applied in excess will enter the interior of a machine and as they will not pass through the oil passages, the same will not lubricate but will cause either blockage or corrosion. As it is impossible to apply just enough composition to seal entirely and not have any excess, if enough of the above mentioned compositions are applied to seal thoroughly their use constitutes a hazard to the internal parts of the machine, and in addition same will not seal the joints without corrosion and yet permit dismounting of the joints without damage. The above mentioned compositions are also absolutely ineffective as lubricants.

In order to overcome these difficulties and produce a composition which is insoluble in water, oil, alco-glycerine compounds, gasoline, benzol, ammonia, and similar liquids, I take a vegetable oil, preferably castor oil, or a mixture of castor oil and other vegetable oils such as olive oil, linseed oil, cottonseed or other similar vegetable oils, and some fish and animal oils, such as menhaden oil, and coal tar or mineral oil capable of polymerization, hydrogenation, or partial oxidation, such as benzol polymerized as styrene or styrol, and heat same for a sufficient length of time at a temperature sufficiently high to drive off a volatile part, and to produce certain chemical reactions which result in a semi-solid grease-like product.

I prefer to heat the castor, vegetable, fish, animal or mineral oil at a temperature of about 200° C. until it thickens to the desired grease-like consistency, the heating being preferably done in a vessel almost covered but fitted with a vent. During the heating a volume of air, of approximately twice the volume of the oil, is blown each minute, through the oil, and the oil is stirred and circulated mechanically in the vessel.

For sealing purposes I prefer to add as an oxidation and polymerization inhibitor any one or more of the following:—thymol, eugenol, isoeugenol, iodine, cis-isosafro-isoeugenol, phenyl-alpha-naphylimine, diphenylhydrazine, cresol, hydroquinon, or other oxidation or polymerization inhibitors or modifiers such as abietic acid, oleic acid, copper, iron, and other metallic salts in the composition.

As soon as the oil has reached the desired consistency the heat is cut and as soon as the oil has dropped below the boiling point of the inhibitor the latter may be added unless it is desired to make compositions which are desired to harden on contact with air; and if a thicker composition is desired the asbestos fibre, mica, wood pulp, infusorial earth or other filler is added. For example, I may add one half of one percent, of the weight of the original oil, of phenyl-alpha-naphylimine, or other inhibitor, and thirty percent, of the original weight of oil, of short asbestos fibre, mica, wood pulp, or infusorial earth, and stir mechanically. These may be mixed when the oil reaches a grease-like consistency (when cool), or stirred into the oils while boiling same. The process takes about eighteen hours.

Instead of using the method above described, the method may consist of merely boiling the oil until it has thickened and then adding the inhibitor and/or asbestos fibre, mica, wood pulp, infusorial earth, or the like, or both the inhibitor or thickener may be added. Or the method may consist in boiling the oil under vacuum, with a condenser returning the condensite to the composition; or cracking out certain fractions by boiling the oil in a condenser open at the upper end so that cracked gases could escape and letting the condensed fractions fall back into the hot oil so as to crack out certain fractions; or boiling the oil at various temperatures while blowing air through the boiling mass; all of which methods by polymerization, (such as by light rays, or high frequency electricity), or by oxidation, or both, produce the thickened castor oil or gum sealing composition.

The resultant composition is effective as a seal between metal or other surfaces, and between all kinds of gaskets and surfaces, pipe threads, hose connectors, and pipe unions, and it is not necessary to draw together parts or gaskets so tightly when coated with my composition because of its sealing and non-changing, non-hardening quality, thus eliminating danger of damaging the parts, stripping of hold-down bolts, nuts, studs, or the like, and thereby lengthening the life of the gaskets, and obviating any danger of stripping any hose-clamps, or the like. It is also an efficient surface protecting composition, and an efficient lubricant for stuffing boxes, or the like.

The novel composition is also an efficient sealing agent for water hoses, etc., as it never dries and retains its qualities indefinitely. The composition is proof against oil, water, ammonia, alcoglycerine compounds, ethylene glycol, steam, salt water, benzol, gasoline, or the like, and is non-corrosive to iron, steel, aluminum, magnesium, or other metals.

I claim:—

1. An insoluble non-oxidizing composition for use in sealing, and coating metal surfaces, comprising boiled castor oil having a grease-like consistency, a filler, and a non-drier.

2. An insoluble composition for use in sealing, and coating metal or other surfaces, comprising boiled castor oil having a grease-like consistency, and an oxidation inhibitor.

3. An insoluble composition for use in sealing, and coating metal surfaces, comprising boiled, polymerized castor oil having a grease-like consistency, an oxidation inhibitor, and filler.

4. An insoluble composition for use in sealing metal surfaces comprising boiled, hydrogenated castor oil having a grease-like consistency, an oxidation inhibitor, and a filler.

5. An insoluble non-polymerizing non-oxidizing sealing composition for use in sealing metal surfaces, comprising thickened castor oil, and an oxidation inhibitor added to arrest the thickening process when the oil is of grease-like consistency.

6. An insoluble non-polymerizing non-oxidizing coating composition for use in sealing metal surfaces, comprising thickened castor oil, an oxidation inhibitor added to arrest the thickening process when the oil is of grease-like consistency, and a wood pulp filler.

HENRY LOWE BROWNBACK.